United States Patent [19]
Itagaki

[11] 3,863,263
[45] Jan. 28, 1975

[54] SYSTEM FOR RECEIVING EXPOSURE INACCURACIES IN AUTOMATIC CAMERAS

[75] Inventor: Takuo Itagaki, Wako, Japan

[73] Assignee: Asahi Kogaku Kogyo Kabushiki Kaisha, Tokyo-to, Japan

[22] Filed: July 5, 1973

[21] Appl. No.: 376,829

[30] Foreign Application Priority Data
July 10, 1972   Japan.................... 47-81370

[52] U.S. Cl...................... 354/24, 354/50, 354/51, 354/60 R
[51] Int. Cl............................ G03b 7/08, G03b 9/62
[58] Field of Search......... 95/10 CE, 10 CT; 354/24, 354/50, 51, 60 R

[56] References Cited
UNITED STATES PATENTS
3,678,826   7/1972   Mori et al.................... 95/10 CT
3,712,194   1/1973   Yoshimura.................... 95/10 CT OTHER PUBLICATIONS
"I.C. Electronics For Shutterbugs," Radio-Electronics, Feb. 1969, pp. 39–42.
"The Application of Some Semiconductors as Logarithmic Elements,". Proceedings of the IRE, pp. 1113–1116, July 1954.

*Primary Examiner*—John M. Horan
*Assistant Examiner*—Russell E. Adams, Jr.
*Attorney, Agent, or Firm*—Steinberg & Blake

[57] ABSTRACT

A camera having an electrical system for automatically determining exposure time. The electrical system includes a signal-generating circuit for generating signals from which it is possible to determine the exposure time. A calculating circuit receives the generated signals and calculates a timing signal therefrom. A timing circuit receives the timing signal and provides from the latter an electrical quantity which is used in the determination of the exposure time. All of these circuits cooperate with each other to eliminate the influence of temperature fluctuations and voltage level fluctuations in the determination of the quantity which corresponds to the exposure time. This latter quantity is then used to charge a timing capacitor which when it reaches a given charge triggers a switching circuit which operates to determine the exposure, and this switching circuit is made up of components which are influenced only to a negligible degree by temperature fluctuations and voltage level fluctuations.

9 Claims, 2 Drawing Figures 3,863,263

3,863,263

SYSTEM FOR RECEIVING EXPOSURE INACCURACIES IN AUTOMATIC CAMERAS

BACKGROUND OF THE INVENTION

The present invention relates to cameras.

More particularly, the present invention relates to automatic cameras capable of automatically determining exposure of film in the camera.

Conventional cameras of this type usually include an electrical system having a section for carrying out various photographic operations as well as a section for automatically timing the exposure and a section for switching in response to the automatic timing in order to terminate an exposure after lapse of an automatically determined exposure time. Circuits of this latter type suffer from serious drawbacks particularly in connection with eliminating from the automatic determination of the exposure time undesirable influences resulting from variations in the voltage source level as well as variations resulting from temperature fluctuations. These latter factors produce a lack of uniformity in the operation of the electrical structure, creating an unavoidable source of inaccuracy in the determination of the exposure time.

SUMMARY OF THE INVENTION

It is accordingly a primary object of the present invention to provide an electrical system which will avoid the above drawbacks.

In particular, it is an object of the present invention to provide an electrical system which will eliminate the influence of temperature fluctuations and voltage source fluctuations, so that the latter factors will not create any undesirable inaccuracies in the automatic determination of exposure time.

It is particularly an object of the present invention to provide an electrical system which for the most part does not require any special components to eliminate the influence of temperature and voltage source fluctuations but rather eliminates these influences by reason of the nature of the circuitry itself.

However, it is also an object of the present invention to provide circuitry of the above general type which has components influenced only to a negligible extent by temperature and voltage source fluctuations at parts of the circuitry which do not automatically eliminate the influences of temperature and voltage source fluctuations.

Furthermore it is an object of the present invention to provide circuitry of the above general type which is exceedingly simple and rugged as well as being composed of inexpensive compact elements.

Thus, it is an object of the present invention to solve problems of the above general type, which are encountered in conventional circuitry, by creating a high-precision electrical circuit for electrically controlling a camera shutter with this circuit having closed loops in sections of the circuit provided for photographic operation and for timing purposes, respectively, while utilizing operational amplifiers provided in accordance with the invention in the form of units which operate in such a way that dependency of the circuit sections upon source voltage and temperature may be neglected while the dependency of any additional elements upon source voltage and temperature can readily be balanced so that in this way the dependency of the exposure time as determined by the circuitry of the invention on influences of source voltage and temperature fluctuations will be reduced to a minimum.

Thus, in accordance with the invention the electrical circuitry includes an assembly of closed loops with the influence of source voltage and temperature fluctuations being limited only to a relatively small number of elements which are not included in the closed loops with the result that complicated measures for counteracting the influence of dependency on source voltage and temperature fluctuations, usually required in conventional circuits, can be very effectively simplified. In addition in accordance with the invention it is possible to make use of a number of operational amplifier units in the form of integrated circuits, with all of these integrated circuits being identical, so that considerable economies may be achieved with the invention.

Thus, according to the present invention the electrical system includes a signal-generating circuit means for generating signals from which it is possible to determine the exposure time. A calculating circuit means receives the signals from the signal-generating circuit means and calculates therefrom a timing signal which in turn is received by a timing circuit means which converts the timing signal into an electrical quantity which may be used in the direct determination of the exposure time. All of the latter three circuit means, namely the signal-generating circuit means, the calculating circuit means, and the timing circuit means are electrically interconnected and cooperate with each other in such a way that the influence of voltage source and temperature fluctuations is effectively eliminated. The timing circuit means is in turn electrically connected to a switching circuit means which in response to the electrical quantity determined by the timing circuit means brings about a termination of the film exposure after a proper, automatically-determined exposure time has elapsed, and this switching circuit means is made up of components which are influenced only to a negligible degree by factors of voltage source and temperature fluctuations.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
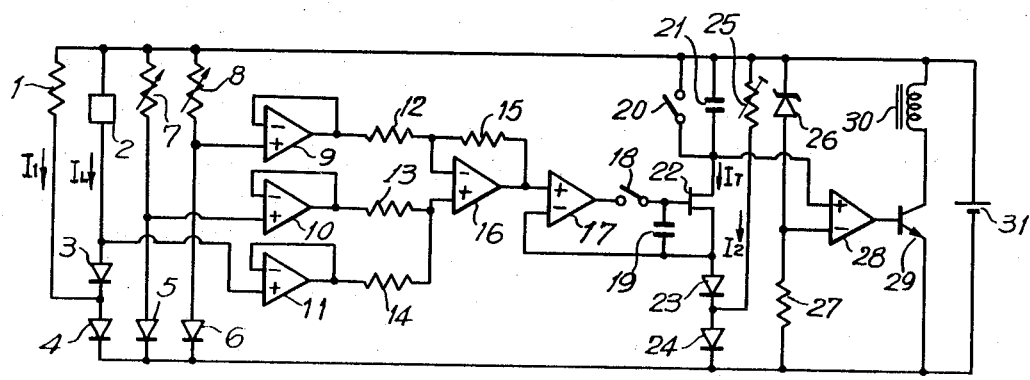
FIG. 1 illustrates a circuit according to the present invention.

Referring to FIG. 1, where a preferred embodiment of a circuit according to the invention is illustrated, the left part of FIG. 1 illustrates a signal-generating circuit means. This signal-generating circuit means includes a photosensitive means such as the photoelectric converter element 2 which may take the form of a photodiode or a cadmium sulfide element for generating an electrical current or a resistance varying in proportion to the intensity of the illumination on the effective surface of the photosensitive means 2. As a result of the light which impinges on the photosensitive means 2, the latter provides an electrical current $I_L$ which is in proportion to the intensity of the illumination of the effective surface, and this electrical current flows through the diode 3 which operates to logarithmically compress the signal, this logarithmic compression diode 3 being connected in series with the photosensitive means 2. Thus, a voltage which is in proportion to the logarithm of the electrical current $I_L$ appears across both of the terminals of the diode 3.

This logarithmic compression diode 3 is connected in series with an additional diode 4, and a resistor 1 is connected to a junction between the diodes 3 and 4. The additional diode 4 is electrically connected with a further additional diode 24 which is connected to a variable resistor 25, so that the components 25 and 24, on the one hand, and the components 1 and 4 on the other hand, cooperate to mutually eliminate any dependency upon temperature fluctuations and fluctuations of the voltage source level derived from the voltage source 31.

The components shown at the left of FIG. 1 operate in such a way that the electrical current $I_1$ flowing from the resistor 1 to the diode 4 and the electrical current $I_L$ provided by the photosensitive means 2 have with respect to each other a relationship $I_L \ll I_1$, so that in this way the terminal voltage of the diode 4 is a substantially constant bias voltage which is independent of the intensity of the light received by the effective surface of the photosensitive means formed by the photoelectric converter element 2. As a result, the operational amplifier 11 receives an input in proportion to the extent of illumination of the effective surface of the photosensitive means 2 which has been biased. This input to the amplifier unit 11 is received by a non-reversible input terminal thereof, this input terminal of the integrated circuit which forms the amplifier unit 11 being connected to a junction between the photosensitive means 2 and the diode 3, as illustrated in FIG. 1.

Assuming that the logarithmic compression provided by the diode 3 is made so as to achieve a logarithm having a base 2, then the output voltage which forms the input to the amplifier 11 is rendered proportional to APEX exponents obtained from addition calculation or APEX calculation of the exposure parameters (brightness, lens aperture, film sensitivity, and exposure time). The proportional relationship established between the extent of illumination of the effective surface of the photosensitive means and the electrical current $I_L$ provided from this illumination and the proportional relationship between the extent of illumination of the effective surface of the photosensitive means and the brightness B of the object to be photographed are utilized to obtain a voltage in proportion to log 2 B on the non-reversible input terminal of the amplifier unit 11.

According to the well known APEX calculations, the photographic relationship between the various photographic factors may be expressed as:

$T_V = B_V + S_V - A_V$ where APEX exponents of brightness B at the object to be photographed, the lens aperture A, the film speed S, and the exposure time T are designated as $B_V$, $A_V$, $S_V$, and $T_V$, respectively.

The non-reversible input terminal of the operational amplifier 11 is thus provided with a voltage which may be expressed as $V_B + V_P 1$     ($V_P 1$ is a constant)

where the terminal voltage of the diode 3 (which is proportional to $B_V$) is designated as $V_B$ and the terminal voltage of the diode 4 is designated as $V_{P1}$. $B_V$ in the APEX calculation may be neglected in this connection since the terminal voltage of the diode 4 is constant as pointed out above. The voltage $V_T$ with respect to the APEX exponent $T_V$ of the exposure may be given by:

$V_T = V_B + V_S - V_A$ where the output voltage obtained by the variable resistor 8 shown in FIG. 1 for introducing the factor of the selected magnitude of the lens aperture and a diode 6 connected in series therewith and the output voltage obtained by the variable resistor 7, set in accordance with the film speed or A S A conversion and a diode 5 connected in series therewith are provided in proportion to the APEX exponents $A_V$ and $S_V$, designated by $V_A$ and $V_S$, respectively, with the same proportional constant. Thus, when the camera is set to introduce the factor of the speed of the film which is to be exposed, an A S A ring is turned by the operator to the A S A index corresponding to the speed of the film which is exposed, and this will serve to set the variable resistor 7 which is connected in series with the diode 5, a junction between the latter components being connected to the input terminal of an operational amplifier 10 which is identical with the operational amplifier 11. In the same way, when the diaphragm selecting ring is turned the variable resistor 8 is adjusted, and a junction between the latter variable resistor and the diode 6 connected in series therewith is electrically connected to the input terminal of a further operational amplifier unit 9 which is identical with the units 10 and 11.

These operational amplifier units 9, 10, and 11 serve as buffer circuits which operate to provide an exact transmission of the output voltages $V_A$, $V_S$ and $V_B$, respectively, and it is possible for these buffer circuits 9–11 to function in a highly satisfactory manner even when the magnitude of the electrical current flowing through the diodes 3, 5, and 6 is extremely small.

The voltage $V_A$ which is proportional to the APEX exponent corresponding to the lens aperture value is supplied to a subtraction terminal of a calculating circuit means formed by an operational amplifier 16 and resistors 12–15 which provide an operational circuit of the APEX type. Thus, the photosensitive means 2, the variable resistors 7 and 8, and the several diodes 3–6 and resistor 1 form together with the buffer amplifier units 9–11 a signal-generating circuit means for generating signals from which it is possible to determine exposure time, as will be apparent from the description which follows. These signals are received by the calculating circuit means formed by components 12–16, with the signal corresponding to the selected magnitude of the exposure aperture being received by the subtraction terminal of the amplifier 16. On the other hand, the signal according to film speed, or in other words the voltage $V_S$ which is proportional to the APEX exponent of the A S A value of the film which is in the camera and the voltage $V_B$ which is proportional to the APEX exponent of the brightness at the object to be photographed together form a signal received by the addition terminal of the amplifier unit 16. In this way the dependency of the diode 5 is added while the dependency of the diode 6 is subtracted, and as a result the dependency of the diodes 5 and 6 upon voltage source and temperature fluctuations is perfectly eliminated at the output terminal of the calculating or operational circuit means 16. Thus, this amplifier unit 16 is provided with voltages $V_B$, $V_A$ and $V_S$ as its input and has an output $V_T$ which forms a timing signal determined by the automatic calculation from the input signals to the calculating means 16 determined from the signal-generating means as described above. This timing signal $V_T$ is in the form of a voltage output from the calculating circuit means 16 received at the non-reversible input terminal of the amplifier unit 17 which forms part of a timing circuit means of the circuitry of the invention.

This timing circuit means which includes the integrated circuit forming the amplifier unit 17 also includes a field effect transistor 22 and a diode 23 forming a logarithmic expansion diode corresponding and balancing the logarithmic compression diode 3. Thus, the timing circuit means formed by components 17, 22, and 23 form a logarithmic expansion circuit which supplies an electrical current which is inversely proportional to the APEX exponent of exposure time to a timing capacitor 21. As was pointed out above, the logarithmic compression diode 3 corresponds to and balances the logarithmic expansion diode 23, so that in this way it is possible to eliminate any influence of temperature fluctuation on the exposure time.

The timing circuit means which includes the amplifier unit 17 as well as the logarithmic expansion diode 23 and the field effect transistor 22 also includes a memory or storage capacitor 19 to adapt the circuit for use with a single lens reflex camera. As is well known, with such a camera when the mirror which reflects the image to the viewfinder swings up beyond the optical axis, the travel of light from the object to be photographed through the objective to the photosensitive means formed by the photoelectric converter element 2 is interrupted. Therefore, in a well known manner, when this mirror swings up just prior to opening of the shutter to expose the film, a switch 18 is automatically opened, and thus even after interruption of travel of light to the photosensitive means 2 the memory or storage capacitor 19 serves to retain the electrical quantity corresponding to the proper exposure time, with the result that an electrical current $I_T$ which is inversely proportional to the exposure time continues to flow through the switch 20 which is still in a closed position just prior to opening of the shutter.

With a single-lens reflex camera of the above type, it is conventional to utilize a focal plane shutter where a leading shutter curtain is released to travel in advance of the cocked trailing shutter curtain so as to open the shutter and start the exposure. When the leading shutter curtain thus runs down to open the shutter the switch 20 is automatically opened in a known manner so that the timing capacitor 21 is now charged with the constant current $I_T$ which is inversely proportional to the exposure time and which forms the electrical quantity which is determined by the timing circuit means which includes the integrated circuit 17 forming the operational amplifier which receives the timing signal from the calculating circuit means 16. The logarithmic expansion diode 23 is connected in series with the additional diode 24, and a junction between these diodes is electrically connected with the variable resistor 25, the diode 24 cooperating with the variable resistor 25 to adjust the voltage level so that the exposure time T may be obtained according to the particular value of $T_V$ which has been achieved with the above circuitry. Assuming that the electrical current supplied from the variable resistor 25 to the diode 24 is $I_2$, then the relationship $I_T \ll I_2$ is provided so that there is no influence of the electrical current $I_T$ which is inversely proportional to the exposure time upon the terminal voltage of the diode 24. This diode 24 corresponds to the diode 4 in order to eliminate dependency of the voltage level upon source voltage and temperature fluctuations and operates independently to eliminate the bias voltage of the voltage $V_B$ which is proportional to the APEX exponent of the brightness B at the object to be photographed, which is due to the terminal voltage $V_{P_1}$ of the diode 4, thus setting the terminal voltage of the diode 24 through the variable resistor 25 so that the exposure time T precisely as achieved from the signal-generating circuit means and calculating circuit means will be effective to determine the exposure time by determining the instant when the transfer or trigger level of a capacity switching circuit means which includes the timing capacitor 21 is effective to terminate the exposure by use of the expanded current $I_T$ which precisely coincides with the result of the photographic operations automatically carried out with the above circuitry.

The terminal voltage of the timing capacitor 21 increases linearly at a rate which is determined by the magnitude of the electrical quantity formed by the electrical current $I_T$ which is inversely proportional to the exposure time T, as well as the capacity of the capacitor 21, and when this terminal voltage reaches a predetermined value the switching circuit means is triggered to terminate the exposure. This switching circuit means includes the operational amplifier 28 in the form of an integrated circuit having its transfer or trigger level determined by the constant voltage or Zener diode 26 and a resistor 27, the trigger circuit means also including a transistor 29, connected to the output of the amplifier unit 28 and serving in response to triggering of the latter to de-energize the electromagnet 30 which while it remains energized maintains the trailing shutter curtain in its cocked position. Thus, in response to triggering of the switching circuit means 28 the transistor 29 will cause the electromagnet 30 to become de-energized in order to release the trailing curtain which now follows the leading curtain to close the shutter and terminate the exposure, as is well known.

As is apparent from the above description, all of the circuit means, namely the single-generating circuit means, the calculating circuit means, and the timing circuit means, cooperate with each other in such a way as to eliminate automatically the influence of temperature and voltage level fluctuations. While the switching circuit means does not operate precisely in this manner, the terminal voltage of the constant voltage diode 26 which determines the trigger or transfer level has a certain dependency upon source voltage and temperature fluctuations, but this dependency is sufficiently small so as to be negligible as compared to the trigger or transfer level of the amplifier unit 28.

The circumstances under which a photographic camera is normally used are extremely severe considering the nature of the photographic camera and the range of temperatures at which the camera may be used, this range being as wide as from −20°C. to 50°C. In addition, such a camera must have a small size and a light weight, so that the battery which forms the voltage source must also have a small size to supply the energy for the electrical circuitry of the electrically controlled automatic structure for determining the operation of the shutter. It is extremely important, therefore, to reduce the possible error in the determination of the exposure time with respect to variations in temperature and voltage source.

The electrical circuitry of conventional cameras of the above type necessarily has the drawback of a lack of uniformity in the operation of the elements, this lack of uniformity being so great that the dependency of conventional circuitry on influences such as temperature and voltage source fluctuations can be effectively reduced only by resorting to complex compensating circuits and extremely troublesome adjustments.

In contrast, with the structure of the present invention the circuitry has the logarithmic compression section, the photographic operation section and the timing section made up of the illustrated assembled closed loops of FIG. 1 where each loop intrinsically has no dependency upon voltage source and temperature fluctuations, while dependency upon the latter factors requires balance only with respect to the voltage level across the opposite ends of an extremely few elements which are not included in these loops with the advantageous result that the possible error in the determination of the exposure time resulting from variations in voltage source and temperature of the entire circuit can be effectively eliminated in a simple manner.

One of the further advantages achieved with the present invention is that all of the amplifier units 9–11, 16, 17, and 28 are identical, these operational amplifiers forming principal components in the circuitry of the invention and being in the form of integrated circuits which may be, for example, of the so-called ope-amp type usually utilized in various analog circuits. Thus, the fact that all of these integrated circuits are of an identical construction contributes greatly to the economic savings which can be effective particularly with mass production techniques.

Figure 2:
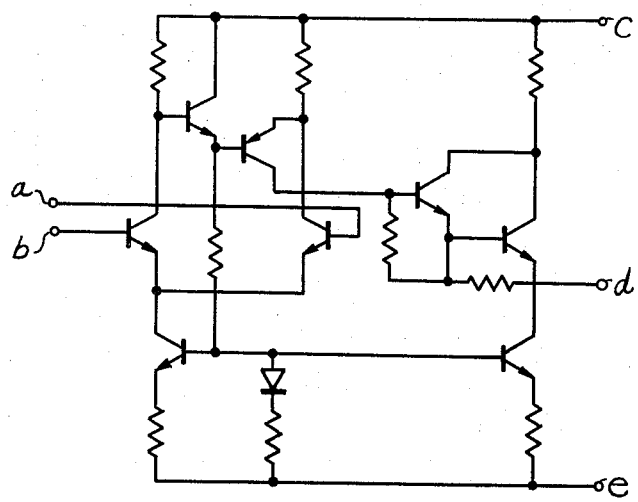
FIG. 2 shows the details of an amplifier unit used in the circuitry of FIG. 1.

FIG. 2 illustrates a preferred embodiment of an ope-amp type of amplifier unit, the circuitry of FIG. 2 representing any of the above amplifier units of FIG. 1 (cf. ELECTRONIC SCIENCE, 1969, 7).

Referring to the amplifier unit shown in FIG. 2, the terminals $a$ and $b$ are respectively the reversible and non-reversible input terminals while the terminals $c$ and $e$ are respectively the positive source and negative source connecting terminals. The terminal $d$ is the output terminal. The operational amplifier may be utilized according to the invention together with a suitable impedance converter such as a field effect transistor in an electrical circuit through which the output current of a photoelectromotive element such as a photodiode is taken out in the form of a short-circuit current output in order to eliminate the bias effect of the photoelectromotive element and thereby obtain a photoelectric current which is in proportion to the extent of illumination of the effective surface of the photoelectric converter element over a wide range. Thus, the exact exposure time may be obtained with respect to a wide range of illumination on the effective surface of the photoelectric converter element by utilizing the photoelectromotive element such as a photodiode and making sufficient use of the characteristic features of the present invention.

What is claimed is:

1. In an electrical system for automatically determining exposure time in a camera, signal-generating circuit means for generating signals from which exposure time can be determined, calculating circuit means electrically connected with said signal-generating circuit means for receiving the signals generated thereby and for calculating a timing signal therefrom, timing circuit means electrically connected with said calculating circuit means for receiving said timing signal therefrom and for creating from said timing signal an electrical quantity the magnitude of which corresponds to the required exposure time, part of said signal-generating circuit means and said calculating circuit means being electrically connected with each other in a closed loop arrangement for eliminating the influence of temperature fluctuations and voltage source fluctuations from some of the signals from said signal-generating means, another part of said signal-generating circuit means and said timing circuit means being electrically connected with each other in a closed loop arrangement for eliminating the influence of temperature fluctuations and voltage source fluctuation from the rest of the signals from said signal-generating means, and switching circuit means electrically connected with said timing circuit means for responding to said electrical quantity for determining the exposure time, said switching circuit means consisting of elements which are influenced to a negligible extent by temperature and voltage source fluctuations, and all of said circuit means including amplifier units, all of said amplifier units of all of said circuit means being of identical structure.

2. The combination of claim 1 and wherein each of said amplifier units is in the form of an integrated circuit.

3. The combination of claim 1 and wherein said signal-generating circuit means includes a photosensitive means for receiving light and providing an electrical quantity corresponding to light intensity and a logarithmic compression diode connected in series with said photosensitive means, said timing circuit means including a logarithmic expansion diode which corresponds to and balances said logarithmic compression diode for eliminating dependency upon temperature fluctuations.

4. In an electrical system for automatically determining exposure time in a camera, signal-generating circuit means for generating signals from which exposure time can be determined, calculating circuit means electrically connected with said signal-generating circuit means for receiving the signals generated thereby and for calculating a timing signal therefrom, timing circuit means electrically connected with said calculating circuit means for receiving said timing signal therefrom and for creating from said timing signal an electrical quantity the magnitude of which corresponds to the required exposure time, said signal-generating circuit means, said calculating circuit means, and said timing circuit means all being electrically connected with each other for eliminating the influence of temperature fluctuations and voltage source fluctuations on the operation of all of said circuit means, and switching circuit means electrically connected with said timing circuit means for responding to said electrical quantity for determining the exposure time, said switching circuit means consisting of elements which are influenced to a negligible extent by temperature and voltage source fluctuations, said signal-generating circuit means including a photosensitive means for receiving light and providing an electrical quantity corresponding to light intensity and a logarithmic compression diode connected in series with said photosensitive means, said timing circuit means including a logarithmic expansion diode which corresponds to and balances said logarithmic compression diode for eliminating dependency upon temperature fluctuations, a pair of additional diodes respectively connected in series with said logarithmic compression and logarithmic expansion diodes and a pair of resistors, one of which is a variable resistor, respectively connected to a pair of junctions one of which is situated between said logarithmic compression diode and the additional diode connected in series therewith and the other of which is situated between said logarithmic expansion diode and said additional diode connected in series therewith, said additional diodes and resistors balancing each other for eliminating the influence of temperature and voltage source fluctuations.

5. The combination of claim 4 and wherein said resistors and additional diodes have with respect to said logarithmic compression and logarithmic expansion diodes a relationship for providing bias voltages which are substantially constant and independent of the electrical quantity corresponding to light intensity and the magnitude of the electrical quantity provided by said timing circuit means.

6. The combination of claim 5 and wherein said signal-generating circuit means further includes a pair of variable resistors for respectively introducing factors of film speed and magnitude of exposure aperture, and a pair of diodes respectively connected in series with said variable resistors, said signal-generating circuit means further including a pair of buffer amplifier units respectively connected electrically to junctions one of which is situated between one of said variable resistors and the diode connected in series therewith and the other of which is situated between the other of said variable resistors and the diode in series therewith, said calculating circuit means including an amplifier unit having subtraction and addition inputs and said buffer amplifier units respectively having outputs respectively connected to said subtraction and addition inputs so that the dependency of said diodes and variable resistors respectively connected in series therewith on voltage source and temperature fluctuations is eliminated.

7. In an electrical system for automatically determining exposure time in a camera, signal-generating circuit means for generating signals from which exposure time can be determined, calculating circuit means electrically connected with said signal-generating circuit means for receiving the signals generated thereby and for calculating a timing signal therefrom, timing circuit means electrically connected with said calculating circuit means for receiving said timing signal therefrom and for creating from said timing signal an electrical quantity the magnitude of which corresponds to the required exposure time, said signal-generating circuit means, said calculating circuit means, and said timing circuit means all being electrically connected with each other for eliminating the influence of temperature fluctuations and voltage source fluctuation on the operation of all of said circuit means, and switching circuit means electrically connected with said timing circuit means for responding to said electrical quantity for determining the exposure time, said switching circuit means consisting of elements which are influenced to a negligible extent by temperature and voltage source fluctuations, said signal-generating circuit means including a pair of variable resistors for respectively introducing the factors of film speed and the magnitude of the exposure aperture and a pair of diodes respectively connected in series with said pair of variable resistors, said signal-generating circuit means further including a pair of buffer amplifier units respectively having inputs connected electrically with a pair of junctions one of which is situated between one of said variable resistors and the diode connected in series therewith and the other of which is situated between the other of said variable resistors and the diode connected in series therewith, said calculating circuit means including an amplifier unit having subtraction and addition inputs and said buffer amplifier units respectively having outputs connected electrically with said subtraction and addition inputs for eliminating the dependency of said variable resistors and diodes respectively connected in series therewith on voltage source and temperature fluctuations.

8. The combination of claim 1 and wherein said switching circuit means includes a timing capacitor electrically connected with said timing circuit means to be charged with said electrical quantity and an amplifier unit electrically connected with said timing capacitor to be triggered when the charge of said capacitor reaches a given value, said switching circuit means further including a constant voltage diode electrically connected with said amplifier unit of said switching circuit means for determining the trigger level thereof and said constant voltage diode having a dependency upon source voltage and temperature fluctuation which is sufficiently small to be negligible as compared to the trigger level of said amplifier unit of said switching circuit means.

9. In an electrical system for automatically determining exposure time in a camera, signal-generating circuit means for generating signals from which exposure time can be determined, calculating circuit means electrically connected with said signal-generating circuit means for receiving the signals generated thereby and for calculating a timing signal therefrom, timing circuit means electrically connected with said calculating circuit means for receiving said timing signal therefrom and for creating from said timing signal an electrical quantity the magnitude of which corresponds to the required exposure time, said signal-generating circuit means, said calculating circuit means, and said timing circuit means all being electrically connected with each other for eliminating the influence of temperature fluctuations and voltage source fluctuations on the operation of all of said circuit means, and switching circuit means electrically connected with said timing circuit means for responding to said electrical quantity for determining the exposure time, said switching circuit means consisting of elements which are influenced to a negligible extent by temperature and voltage source fluctuations, said signal-generating circuit means including a photosensitive means for responding to light intensity to provide an electrical quantity corresponding to light intensity and a logarithmic compression diode connected in series with said photosensitive means, and a buffer amplifier unit having an input electrically connected to a junction between said photosensitive means and said logarithmic compression diode, said signal-generating circuit means further including a pair of variable resistors for introducing the factors of film speed and magnitude of exposure aperture and a pair of diodes respectively connected in series with said pair of variable resistors, a pair of additional buffer amplifier units respectively having inputs connected electrically to a pair of junctions one of which is situated between one of said variable resistors and the diode connected in series therewith and the other of which is situated between the other of said pair of variable resistors and the diode connected in series therewith, said calculating circuit means including an amplifier unit having subtraction and addition inputs, said subtraction input being electrically connected with that one of said buffer amplifier units which is connected to the junction between said variable resistor for introducing the selected magnitude of the exposure aperture and the diode connected in series therewith and said addition input being connected to the outputs of the remaining two buffer amplifier units, so that said variable resistors and diodes respectively connected in series therewith operate to eliminate any dependency on temperature and voltage source fluctuations, said timing circuit means having a logarithmic expansion diode for balancing said logarithmic compression diode, and a pair of additional diodes respectively connected in series with said logarithmic compression and logarithmic expansion diodes and a pair of resistors one of which is a variable resistor respectively connected electrically to junctions one of which is situated between said logarithmic compression diode and the diode connected in series therewith and the other of which is situated between said logarithmic expansion diode and the diode connected in series therewith, for operating said timing circuit means and that part of said signal-generating circuit means which provides an electrical quantity corresponding to light intensity without dependence upon temperature and voltage source fluctuations, and said switching circuit means including a constant voltage diode which is influenced by voltage source and temperature fluctuations to a negligible extent as compared with the switching level of said switching circuit means, said timing circuit means and switching circuit means including amplifier units, and the latter amplifier units together with the buffer amplifier units and the amplifier unit of said calculating circuit means all having an identical construction and all being in the form of integrated circuits.

* * * * *